US009758125B2

(12) United States Patent
Matsushima et al.

(10) Patent No.: US 9,758,125 B2
(45) Date of Patent: Sep. 12, 2017

(54) VEHICLE BODY FRONT STRUCTURE

(71) Applicant: HONDA MOTOR CO., LTD., Tokyo (JP)

(72) Inventors: Yuki Matsushima, Wako (JP); Daisuke Naoi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/303,054

(22) PCT Filed: Dec. 24, 2014

(86) PCT No.: PCT/JP2014/084059
§ 371 (c)(1),
(2) Date: Oct. 10, 2016

(87) PCT Pub. No.: WO2015/162828
PCT Pub. Date: Oct. 29, 2015

(65) Prior Publication Data
US 2017/0036643 A1 Feb. 9, 2017

(30) Foreign Application Priority Data

Apr. 22, 2014 (JP) ................. 2014-087987

(51) Int. Cl.
*B60N 99/00* (2006.01)
*B60R 21/38* (2011.01)
(Continued)

(52) U.S. Cl.
CPC .......... *B60R 21/38* (2013.01); *B60R 21/0136* (2013.01); *B62D 25/08* (2013.01);
(Continued)

(58) Field of Classification Search
CPC ............... B60R 21/38; B60R 21/0136; B60R 2021/0004; B60R 2021/01013;
(Continued)

(56) References Cited

U.S. PATENT DOCUMENTS 4,015,870 A * 4/1977 Stcherbatcheff ........ B60R 21/34
293/32
2002/0011365 A1* 1/2002 Sasaki ..................... B60R 21/38
180/69.2

(Continued)

FOREIGN PATENT DOCUMENTS

JP 06-270843 9/1994
JP 2010-221783 10/2010

OTHER PUBLICATIONS

International Search Report, Date of mailing: Mar. 31, 2015 (Mar. 31, 2015).

*Primary Examiner* — Lori L Lyjak
(74) *Attorney, Agent, or Firm* — Rankin, Hill & Clark LLP

(57) ABSTRACT

In a vehicle body front structure, an operating unit that extends upward to raise a front hood by a predetermined amount when a vehicle collides against an obstacle in front is arranged in a dashboard upper configured to introduce outside air into an interior. The operating unit is mounted in a vehicle body so as to be displaced downward by an external force acting from above after extending upward. An opening portion for drain is provided in a bottom portion of the dashboard upper. The opening portion is arranged at a position where the operating unit can be moved downward by the external force acting from above after extending upward.

5 Claims, 10 Drawing Sheets

(51) Int. Cl.
  *B62D 25/08* (2006.01)
  *B62D 25/10* (2006.01)
  *B60R 21/0136* (2006.01)
  *B60R 21/00* (2006.01)
  *B60R 21/01* (2006.01)

(52) U.S. Cl.
  CPC ...... *B62D 25/10* (2013.01); *B60R 2021/0004* (2013.01); *B60R 2021/01013* (2013.01); *B60R 2021/01286* (2013.01); *B60Y 2400/40* (2013.01)

(58) Field of Classification Search
  CPC .......... B60R 2021/01286; B62D 25/08; B62D 25/10; B60Y 2400/40
  See application file for complete search history.

(56) References Cited

U.S. PATENT DOCUMENTS

| | | | |
|---|---|---|---|
| 2005/0206199 A1* | 9/2005 | Minami | B60R 21/38 296/193.11 |
| 2007/0125589 A1* | 6/2007 | Murphy | B60R 21/013 180/274 |
| 2010/0263957 A1* | 10/2010 | Shaw | B60R 21/38 180/281 |

* cited by examiner (a)

(b)

VEHICLE BODY FRONT STRUCTURE

TECHNICAL FIELD

The present invention relates to a vehicle body front structure that improves a dashboard upper.

BACKGROUND ART

Rainwater that has fallen onto a windshield flows from a cowl top to a dashboard upper. A vehicle body front structure with a drain unit provided on the dashboard upper is known in, for example, Japanese Patent Laid-Open No. 6-270843 (PTL 1).

In the vehicle body front structure disclosed in PTL 1, a cowl top lower panel (dashboard lower panel) is located behind the engine room, and apron upper panels (upper frames) are located on the sides of the engine room. The upper ends of the upper frames and the upper end of the dashboard lower panel are connected by a hood hinge bracket (dashboard upper). The dashboard upper is partially overlaid on the upper ends of the upper frames. A drain hole that opens outward from the upper frame is formed in each overlaid gportion.

Rainwater that has fallen onto the windshield flows to the dashboard upper via the upper portion of the dashboard lower panel and is drained from the drain holes to the outside of the upper frames. This prevents the water from flowing into the engine room and splashing electric components. However, since the drain holes are formed in the upper frames of the vehicle body frame as well, there is room for improvement from the viewpoint of ensuring vehicle body rigidity and increasing shock absorption performance at impact. For example, a measure such as increasing the plate thickness of the upper frames is necessary.

To relax the shock of the secondary impact of a walker who collides with a vehicle, an automotive safety device is recently known, which raises the rear end of the front hood of the vehicle and increases the amount of deformation of the front hood caused by the secondary impact of the walker. Such an automotive safety device includes an operating unit configured to raise and hold the front hood. The operating unit employs a direct operated actuator formed from a cylinder and a piston rod. A high-pressure gas is generated in the cylinder, thereby moving the piston rod upward and raising the front hood. The operating unit is long in the vertical direction. The lower end of the operating unit displaces downward after the secondary impact of the walker.

The dashboard upper is arranged under the rear end of the front hood. Since the operating unit is long in the vertical direction, and a through hole or concave portion configured to retract the operating unit downward after the secondary impact of the walker is needed, it is necessary to form a through hole or a concave portion largely recessed downward in the dashboard upper. That is, a gap needs to be provided between the dashboard upper and the lower end of the operating unit that displaces downward to prevent interference between them. For this reason, the layout of members such as the dashboard upper and the operating unit is limited.

CITATION LIST

Patent Literature

PTL 1: Japanese Patent Laid-Open No. 6-270843

SUMMARY OF INVENTION

Technical Problem

It is an object of the present invention to provide a vehicle body front structure capable of ensuring vehicle body rigidity and increasing shock absorption performance at impact without increasing the plate thickness and improving the degree of freedom of layout of members while ensuring a through hole or concave portion configured to retract the operating unit downward at a secondary impact.

Solution to Problem

According to a first aspect of the invention, there is provided a vehicle body front structure in which an operating unit that extends upward to raise a front hood by a predetermined amount when a vehicle collides against an obstacle in front is arranged in a dashboard upper configured to introduce outside air into an interior, and the operating unit is mounted in a vehicle body so as to be displaced downward by an external force acting from above after extending upward, wherein an opening portion for drain is provided in a bottom portion of the dashboard upper, and the opening portion is arranged at a position where the operating unit displaced downward can move.

As described in a second aspect of the invention, preferably, the opening portion is located to insert in advance at least part of the operating unit before extending upward.

As described in a third aspect of the invention, more preferably, the opening portion is formed into a hole shape long in a back-and-forth direction of the vehicle body, and a size of a gap between the operating unit and a rear edge of the opening portion is set to be larger than a size of a gap between the operating unit and a front edge of the opening portion.

As described in a fourth aspect of the invention, more preferably, only an upper portion of the operating unit is mounted on the vehicle body.

As described in a fifth aspect of the invention, more preferably, the opening portion is located near a hood hinge supporting the front hood.

Advantageous Effects of Invention

In the invention according to the first aspect, the operating unit is mounted in the vehicle body so as to be displaced downward by an external force acting from above after extending upward. Since the opening portion for drain is provided in the bottom portion of the dashboard upper, and the upper frame has no opening, the vehicle body rigidity and shock absorption performance at impact can be ensured without increasing the plate thickness or sectional area of the upper frame.

Since the opening portion is arranged at a position where the operating unit displaced downward can move, the operating unit after extending upward at a secondary impact directly passes through the opening portion. It is therefore possible to improve the degree of freedom of layout of members while imparting the function of ensuring a clearance to retract the operating unit downward to the dashboard upper.

In the invention according to the second aspect, the opening portion is located to insert in advance at least part of the operating unit before extending upward. Hence, the opening portion has a guide function of moving the operating unit downward.

In the invention according to the third aspect, the opening portion is formed into a hole shape long in a back-and-forth direction of the vehicle body, and a size of a gap between the operating unit and a rear edge of the opening portion is set to be larger than a size of a gap between the operating unit and a front edge of the opening portion. When the front hood displaces downward while moving to the back side of the vehicle in a collision of the front surface of the vehicle, the operating unit also moves to the back side of the vehicle along with the movement of the front hood to the back side of the vehicle. Since the gap between the operating unit and the rear edge of the opening portion is large, the operating unit does not interfere with the edge of the opening portion. For this reason, the operating unit can move downward in a desired mode after extending.

In the invention according to the fourth aspect, since only the upper portion of the operating unit is mounted on the vehicle body, the distance from the point of action to the support point is short. The deflection in the moving direction can be small, and the downward movement of the operating unit after extending is not impeded.

In the invention according to the fifth aspect, the opening portion is located near a hood hinge supporting the front hood. When arranged toward in the opening portion, the operating unit is also located near the hood hinge. Hence, the operating unit can push the mount portion of the hood hinge upward, and the rear end of the front hood can instantaneously be raised.

DESCRIPTION OF EMBODIMENTS

The best mode for carrying out the invention will now be described with reference to the accompanying drawings. Note that in this specification, "front (Fr)", "rear (Rr)", "left (L)", "right (R)", "up (Up)", and "down (Down)" represent directions viewed from a driver.

Embodiment

A vehicle body front structure according to an embodiment of the present invention will be described first with reference to the accompanying drawings.

Figure 1:
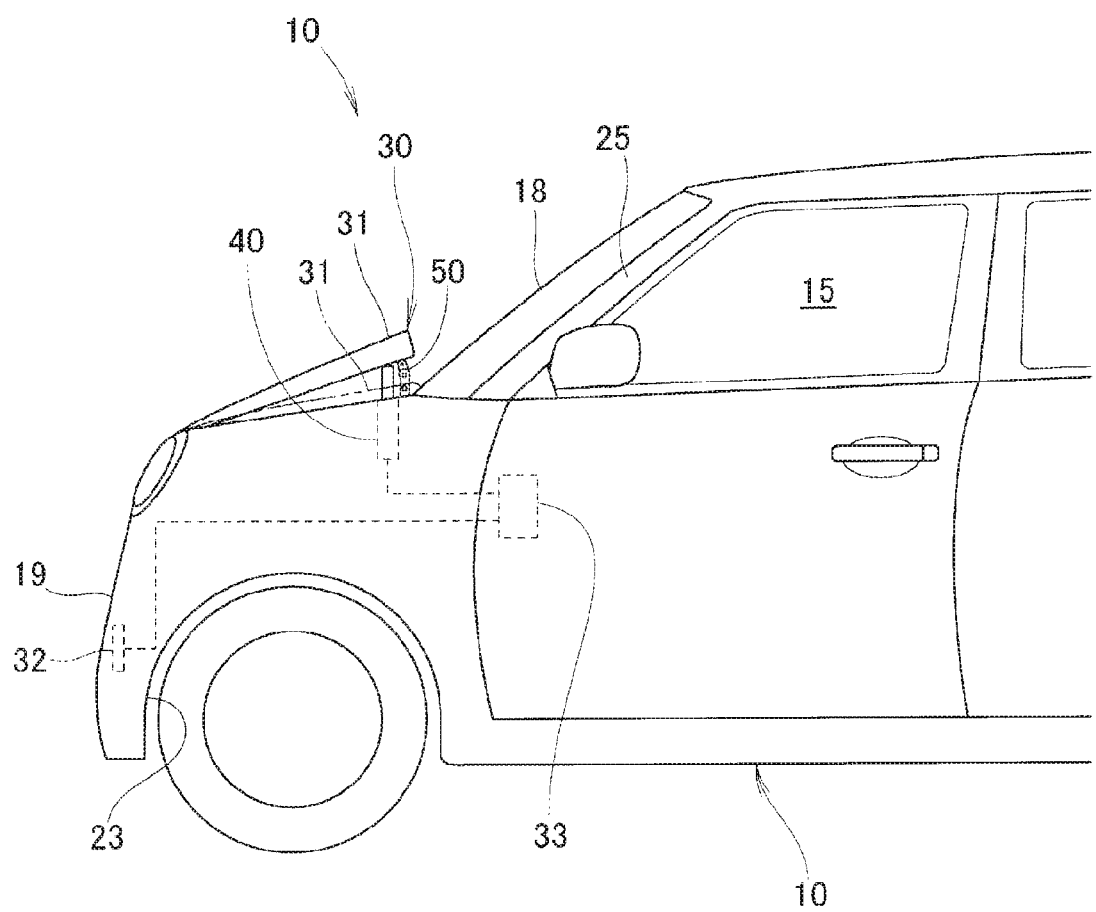
FIG. 1 is a side view of a vehicle that employs a vehicle body front structure according to the present invention.
Figure 2:
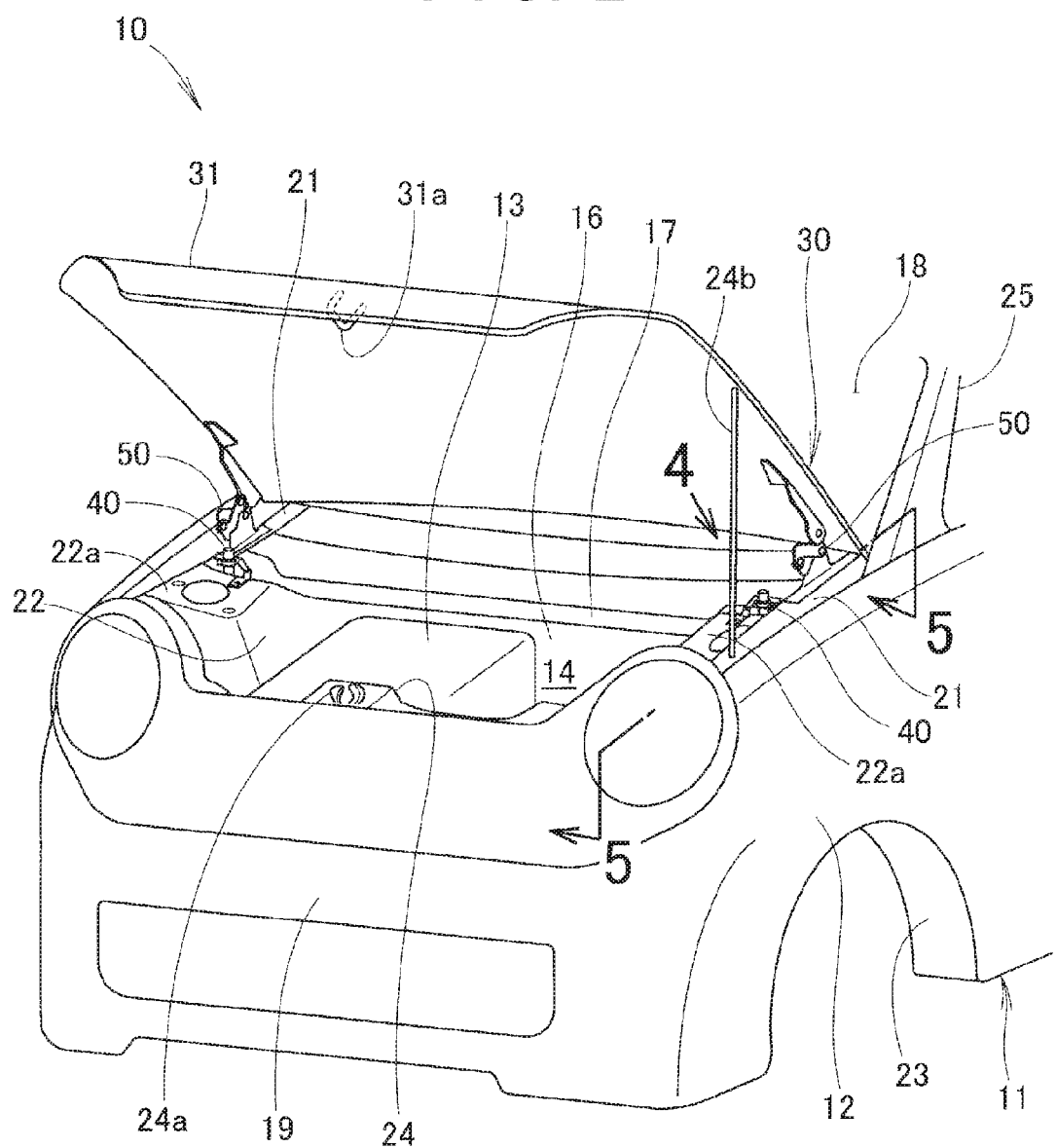
FIG. 2 is a perspective view of the vehicle shown in FIG. 1.

As shown in FIGS. 1 and 2, a vehicle 10 is an automobile. An engine room 14 storing an engine 13 is formed between left and right front fenders 12 (only the left front fender is shown) of a vehicle body 11. An interior 15 is formed behind the engine room 14.

The engine room 14 and the interior 15 are partitioned by a dashboard lower panel 16 and a dashboard upper 17. The dashboard lower panel 16 is formed like an upright wall. The dashboard upper 17 is provided on the upper end of the dashboard lower panel 16. The rear end of the dashboard upper 17 is connected to the lower end of a windshield 18 inclined to the lower front side. The dashboard upper 17 has a function of introducing outside air into the interior 15 and a function of receiving and draining rainwater and the like running down the windshield 18.

The front part of the vehicle body 11 includes left and right upper frames 21, left and right damper housings 22 (only the right damper housing is shown), horizontal plate-shaped damper bases 22a formed on the upper ends of the left and right damper housings 22, left and right wheel houses 23 (only the left wheel house is shown), and a front bulkhead 24. The left and right upper frames 21 extend forward from left and right front pillars 25 (only the left front pillar is shown) and curve to the front side of the left and right wheel houses 23. The left and right wheel houses 23 continue to the lower portions of the left and right damper housings 22.

A front hood 31 that forms an automotive safety device 30 is arranged above the engine room 14 in front of the windshield 18. When the vehicle 10 collides against an obstacle, the automotive safety device 30 raises the front hood 31 from a position indicated by an imaginary line to a position indicated by a solid line and holds the raised front hood 31. The automotive safety device 30 will be described below in detail.

The automotive safety device 30 includes the front hood 31 that is of a front opening type and closes the upper opening of the engine room 14, left and right operating units 40 that push the left and right rear ends of the front hood 31 indicated by the imaginary line and raise the front hood 31 to the position indicated by the solid line, and a bumper senor 32 that is arranged near a bumper face 19 and detects a collision of the vehicle 10 against an obstacle. The automotive safety device 30 further includes a control unit 33 that transmits an operation signal to the left and right operating units 40 based on a collision detection signal from the bumper senor 32, and left and right hood hinges 50 that pivotally support the left and right rear ends of the front hood 31 and hold the left and right rear ends of the front hood 31 at the raising position indicated by the solid line at impact.

Note that the operating unit 40 includes components common to the left and right, and the hood hinge 50 includes components common to the left and right. For the sake of convenience, the left operating unit 40 and the left hood hinge 50 will be described, and a description of the right operating unit 40 and the right hood hinge 50 will be omitted. Since the left and right structures in the vehicle width direction are the same, only the members on the left side will be explained.

The front hood 31 is configured to open its front part using the hood hinges 50 on the rear part as a fulcrum for the maintenance of the engine room 14 in a normal state. When the front hood 31 is closed, a striker 31a provided at the front end of the front hood 31 and a latch 24a provided on the upper portion of the front bulkhead 24 are locked to prevent the front hood 31 from rising. When the front hood 31 is opened, an open stay 24b holds the open state.

The dashboard upper 17 and the operating unit 40 will be described next.

Figure 3:
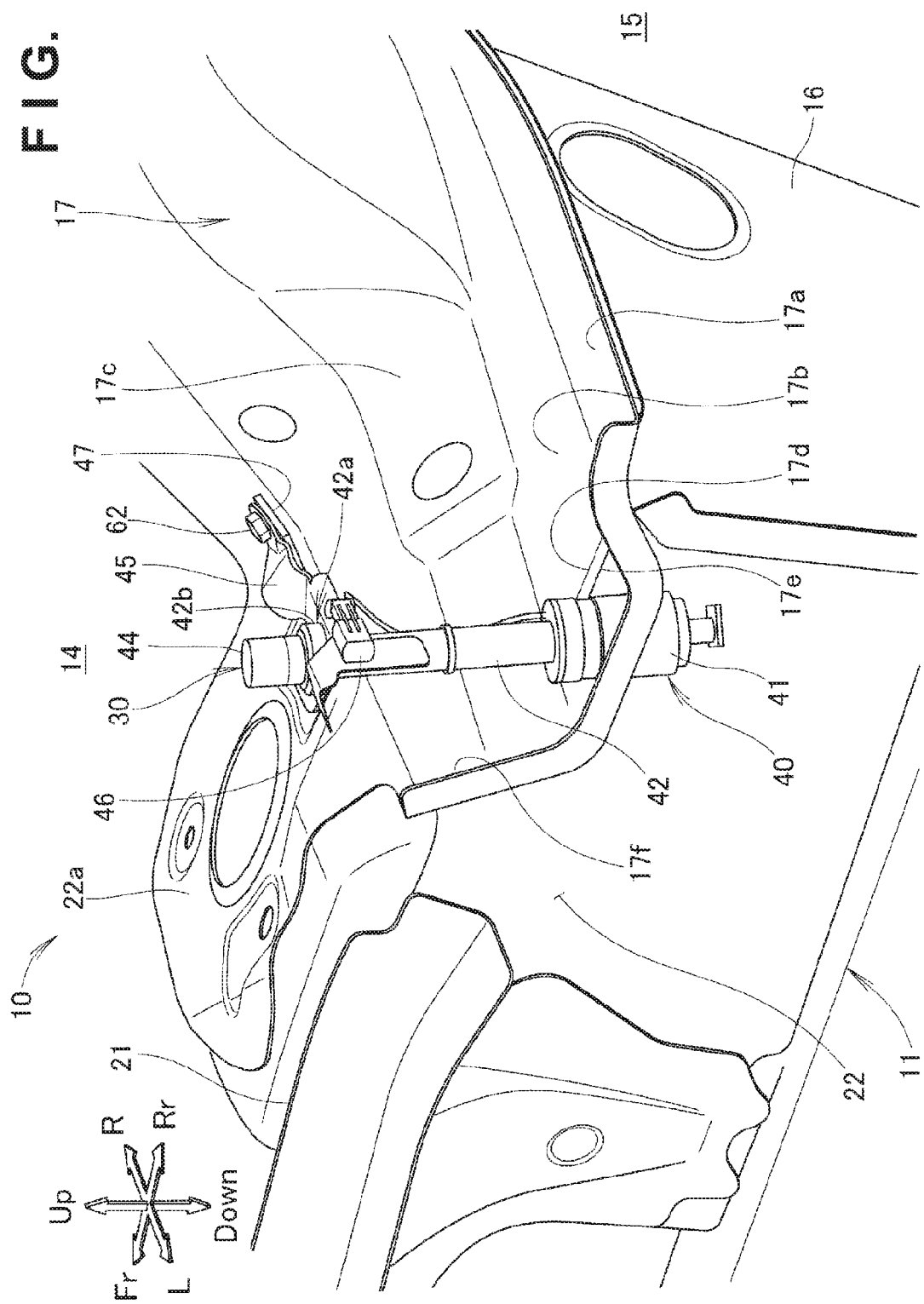
FIG. 3 is a perspective view of the periphery of an operating unit shown in FIG. 2.
Figure 4:
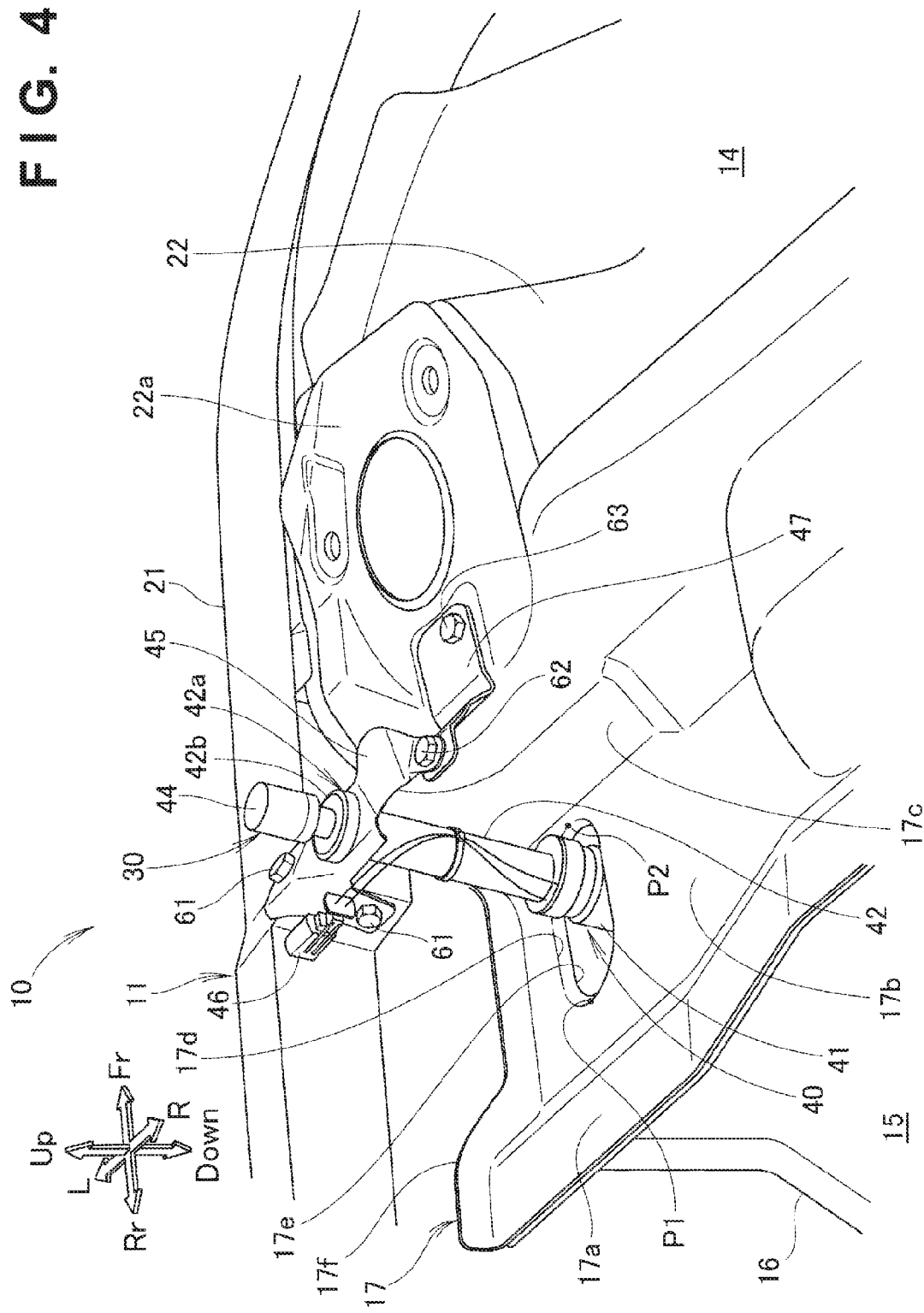
FIG. 4 is a view from an arrow 4 in FIG. 2.
Figure 5:
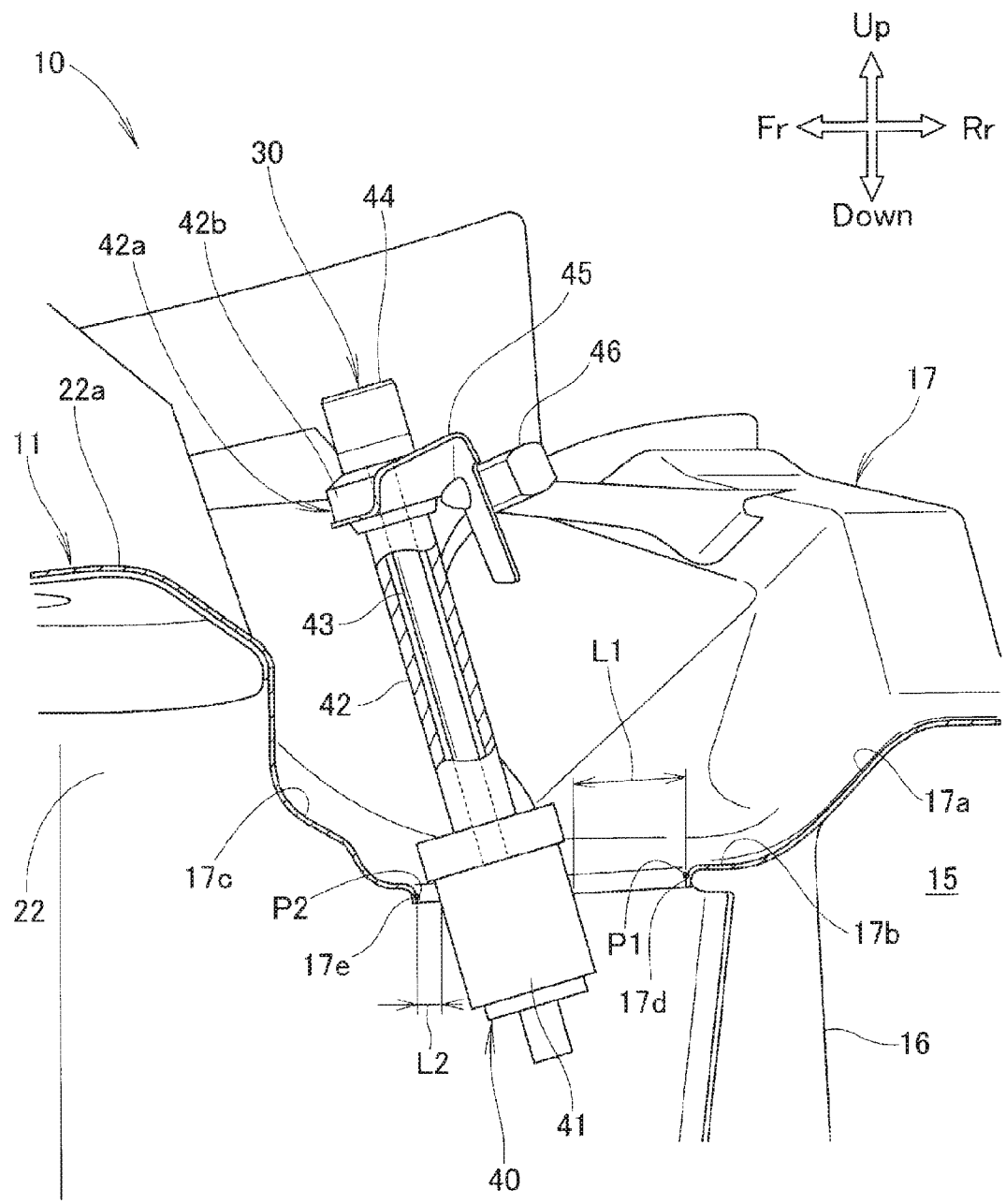
FIG. 5 is a sectional view taken along a line 5-5 in FIG. 2.

As shown in FIGS. 3 to 5, the dashboard upper 17 is provided on the upper end of the dashboard lower panel 16, and formed long in the vehicle width direction. The dashboard upper 17 is formed into a concave section opening upward when viewed from a side of the vehicle, and includes a forward downslope portion 17a formed to be downslope from the rear end, a bottom portion 17b extending forward from the lower end of the forward downslope portion 17a, and a forward upslope portion 17c formed to be upslope from the front end of the bottom portion 17b. Since the dashboard upper 17 is formed into a concave section, the rigidity in the vehicle width direction can be improved.

Opening portions 17d for drain are provided at two ends of the bottom portion 17b in the vehicle width direction. A reinforcing annular portion 17e extends downward from the edge of each opening portion 17d. The reinforcing annular portion 17e functions as a rib and can improve the rigidity of the bottom portion 17b without separately providing a rib. The forward downslope portion 17a allows water from the windshield 18 to quickly flow to the bottom portion 17b. In addition, the forward upslope portion 17c can prevent water on the bottom portion 17b from flowing into the engine room 14.

Each end of the dashboard upper 17 in the vehicle width direction includes a portion 17f bent upward. The bent portion 17f is welded to the left upper frame 21 (see FIG. 2). Hence, the rigidity at the two ends of the dashboard upper 17 in the vehicle width direction can be improved. Since the opening portions 17d are formed near the bent portions 17f, a decrease in the rigidity caused by the openings can be compensated for. In addition, since the opening portion 17d is located outside the left damper housing 22, drainage from the opening portion 17d never enters the engine room 14.

The opening portions 17d for drain are provided only in the bottom portion 17b of the dashboard upper 17, and the upper frames 21 have no opening. For this reason, the vehicle body rigidity and shock absorption performance at impact can be ensured without increasing the plate thickness or sectional area of the upper frames 21.

The left operating unit 40 is mounted on the vehicle body 11, and includes an inflator 41 located at the lower portion of the operating unit 40 and having a columnar appearance, a cylinder 42 having a cylindrical shape and extending upward from the inflator 41, a rod 43 movably stored in the cylinder 42, and a push portion 44 provided at the upper end of the rod 43.

The left operating unit 40 is formed long in the vertical direction as a whole. A support member 45 is provided on an upper portion 42a of the operating unit 40, more specifically, on the upper portion 42a of the cylinder 42. One end of the support member 45 is mounted on the vehicle body 11 by fastening members 61, and the other end of the support member 45 is mounted on the vehicle body 11 by a fastening member 62. Note that a fixing portion 42b configured to fix the cylinder 42 to the support member 45 is formed on the upper portion 42a.

More specifically, a bracket 47 is mounted on the left damper base 22a by a fastening member 63. The fastening members 61, 62, and 63 are bolts. One end of the support member 45 is mounted on the left upper frame 21 (vehicle body 11) by the bolts 61, and the other end of the support member 45 is mounted on the bracket 47 by the bolt 62. A harness 46 is also fastened to the support member 45 by a clip. That is, since the support member 45 serves as both the support of the operating unit 40 itself and the support of the harness 46, the number of components for the support can be decreased.

The left operating unit 40 ignites a gas generator in the inflator 41 to generate a gas and moves the rod 43 upward by the gas, thereby causing the push portion 44 at the distal end of the rod 43 to raise the rear end of the front hood 31.

The opening portion 17d is arranged at a position where the left operating unit 40 displaced downward can move. More specifically, the opening portion 17d is located to insert in advance at least part of the left operating unit 40 before extending upward. For this reason, the left operating unit 40 after extending upward at a secondary impact directly passes through the opening portion 17d. Since the opening portion 17d for drain is used as a clearance to retract the left operating unit 40 downward, the shape of the dashboard upper 17 need not particularly be changed. As a result, it is possible to improve the degree of freedom of layout of members while ensuring the portion to allow the downward movement of the left operating unit 40.

Note that in this embodiment, part of the left operating unit 40 is inserted in the opening portion 17d in advance. However, the present invention is not limited to this. The left operating unit 40 may be located above the opening portion 17d if the left operating unit 40 displaced downward can move.

The opening portion 17d is formed into a hole shape long in the back-and-forth direction of the vehicle body. The size of the gap between the operating unit 40 and a rear edge P1 of the opening portion 17d is L1, and the size of the gap between the operating unit 40 and a front edge P2 of the opening portion 17d is L2. L1 is set to be larger than L2.

When the front hood 31 displaces downward while moving to the back side of the vehicle in a collision of the front surface of the vehicle, the operating unit 40 also moves to the back side of the vehicle along with the movement of the front hood 31 to the back side of the vehicle. Since the gap between the operating unit 40 and the rear edge P1 of the opening portion 17d is large, the operating unit 40 does not interfere with the edge P1 of the opening portion 17d. For this reason, the operating unit 40 can move downward in a desired mode after extending.

The hood hinge 50 will be described next.

Figure 6:
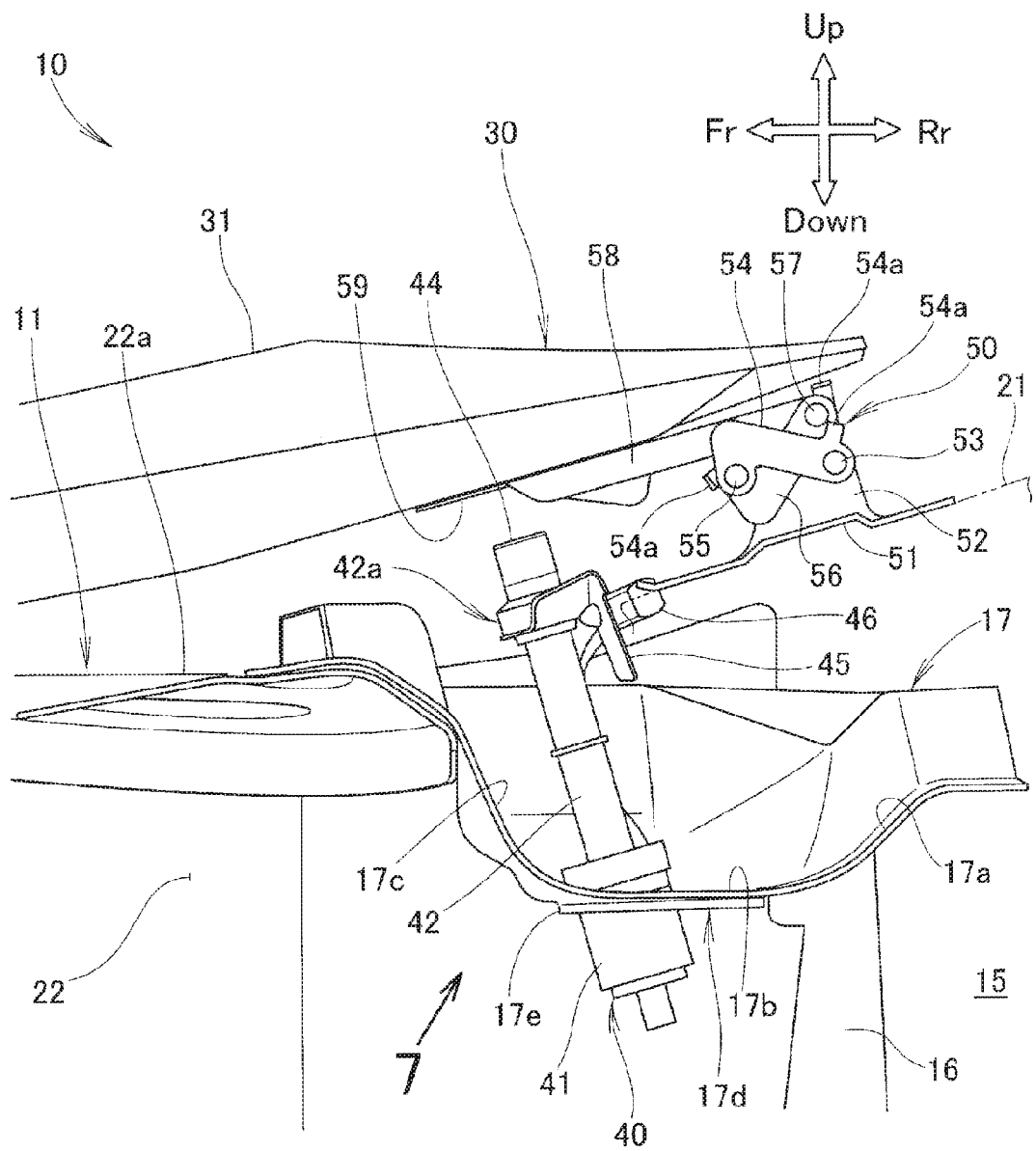
FIG. 6 is a side view of the periphery of a hood hinge shown in FIG. 2.
Figure 7:
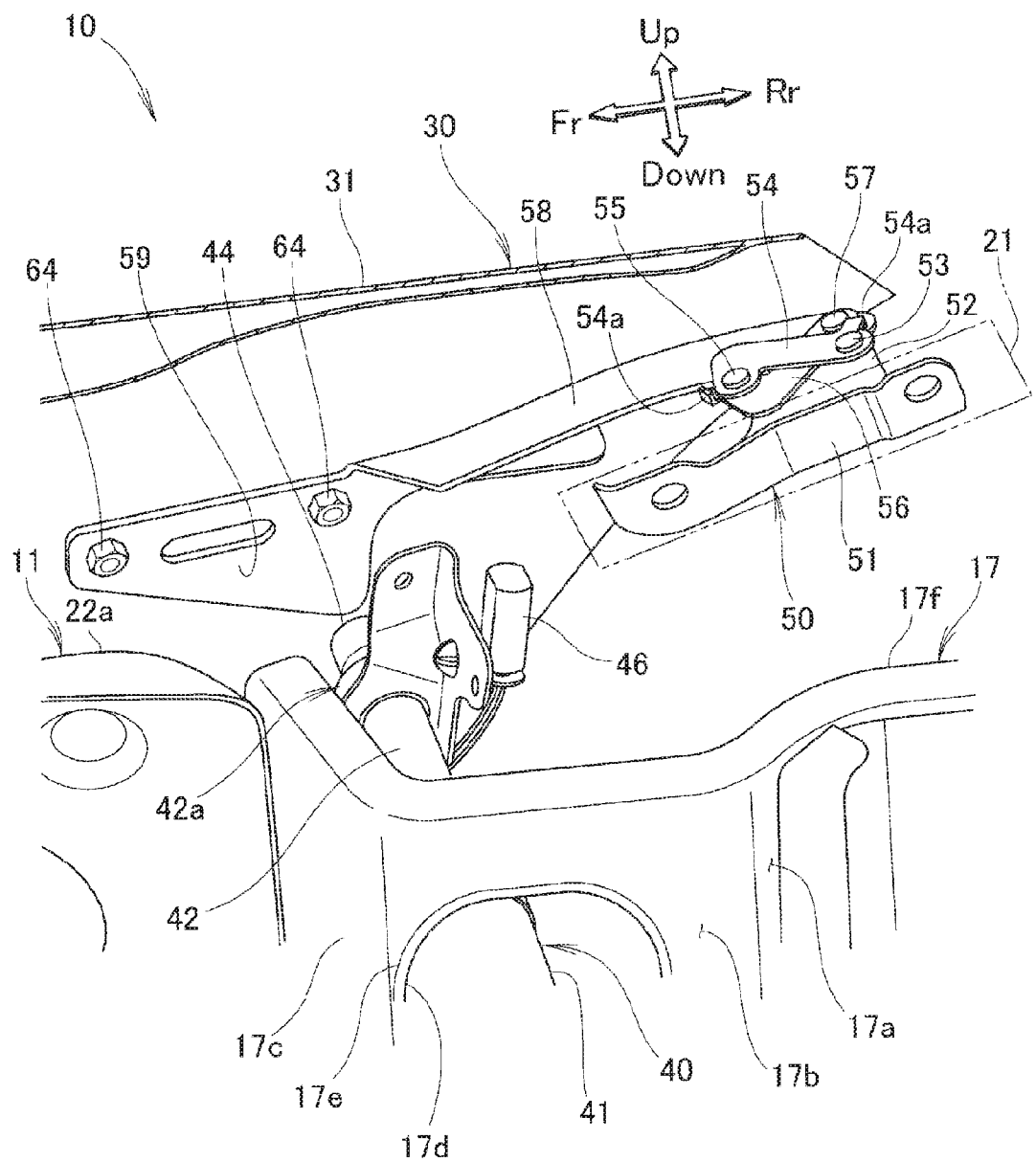
FIG. 7 is a view from an arrow 7 in FIG. 6.

As shown in FIGS. 6 and 7, the left hood hinge 50 has the lower side mounted on the rear part of the left upper frame 21 of the vehicle body 11 by fastening members (not shown) and the upper side mounted on the front hood 31 by fastening members 64. Note that in this embodiment, the fastening members 64 are bolts. However, the present invention is not limited to this, and the hood hinge may be mounted by rivets or the like. The left hood hinge 50 will be described below in detail.

The lower side of the left hood hinge 50 includes a lower mount seat 51 to be mounted on the left upper frame 21, and a lower bracket 52 rising from the lower mount seat 51. The upper side of the left hood hinge 50 includes an upper mount seat 59 to be mounted on the lower surface of the rear part of the front hood 31, and an upper bracket 58 extending downward from the upper mount seat 59.

In the left hood hinge 50, the lower end of a first link 54 is swingably mounted on the lower bracket 52 via a first pin 53, the lower end of a second link 56 is swingably mounted on the upper end of the first link 54 via a second pin 55, and the upper bracket 58 is swingably mounted on the upper end of the second link 56 via a third pin 57.

In a normal state, when the front part of the front hood 31 is opened, the upper bracket 58 swings about the third pin 57 serving as a fulcrum. In the normal opening/closing of the front hood 31, the first link 54 and the second link 56 are locked by pawls 54a and do not swing.

The left hood hinge 50 is located at the rear end in the front hood 31 and, on a side view of the vehicle, located on the upper back side of the vehicle with respect to the upper portion 42a of the cylinder 42. The push portion 44 of the left operating unit 40 is located near the left hood hinge 50. The opening portion 17d is located near the left hood hinge 50 supporting the front hood 31.

When arranged toward the opening portion 17d, the left operating unit 40 is also located near the left hood hinge 50. Hence, the push portion 44 of the left operating unit 40 can push the mount portion (upper mount seat) 59 of the left hood hinge 50 upward, and the rear end of the front hood 31 can instantaneously be raised. The front part of the upper mount seat 59 is formed wide, and the wide portion can receive the push portion 44. The lower surface of the front hood 31 is reinforced by the wide portion of the upper mount seat 59. For this reason, even when abruptly pushed by the push portion 44, the rear part of the front hood 31 can be raised by a predetermined amount without making a dent in the front hood 31.

The functions of the operating unit 40 and the hood hinge 50 described above will be explained.

Figure 8:
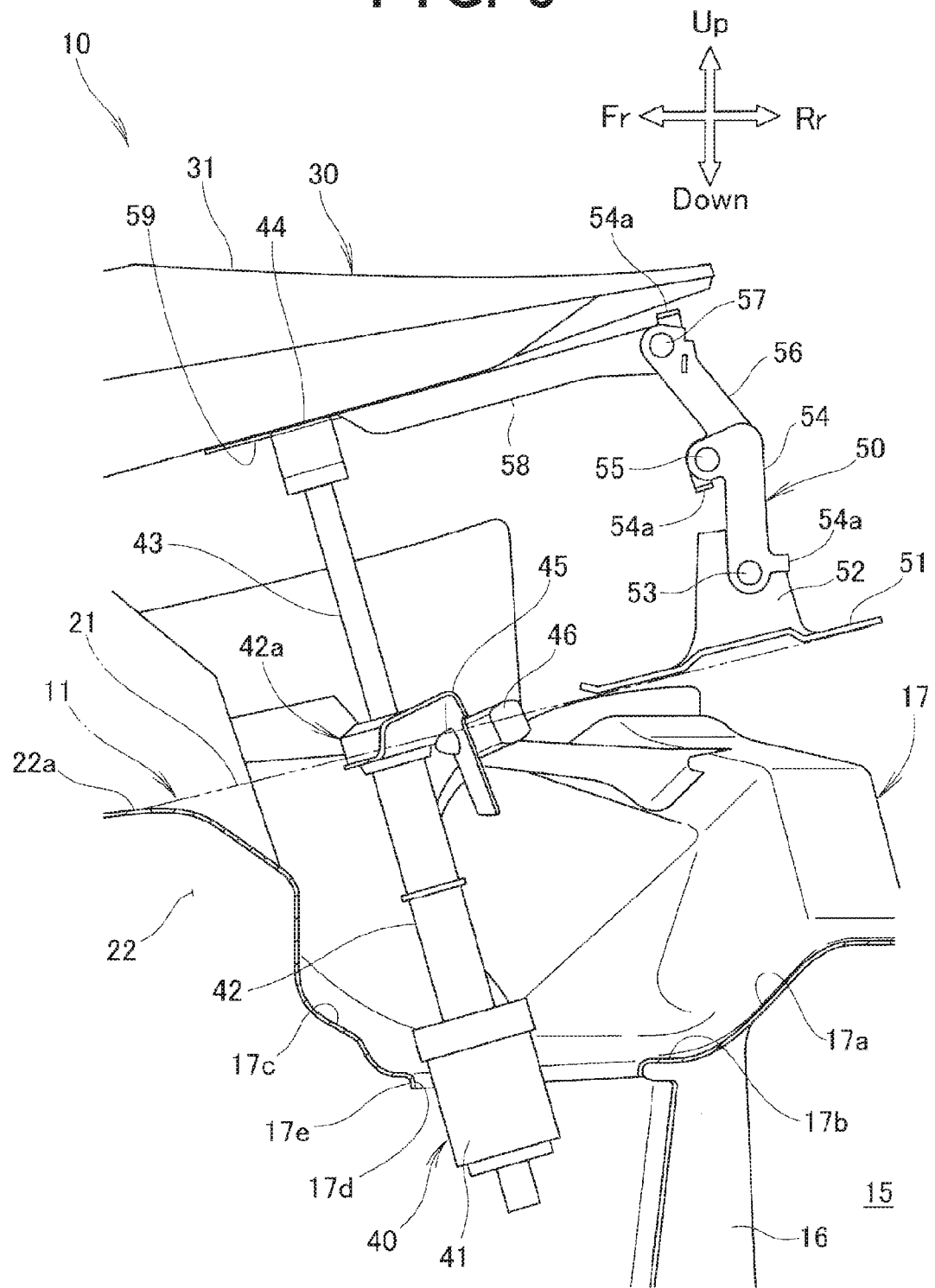
FIG. 8 is a view of the functions of the operating unit and the front hood shown in FIG. 6.

As shown in FIGS. 6 to 8, in a collision of the vehicle, the left operating unit 40 operates, and the rod 43 moves upward. The push portion 44 of the rod 43 abuts against the upper mount seat 59 and further moves upward to raise the rear end of the front hood 31.

Along with the upward movement of the rear end of the front hood 31, the first link 54 and the second link 56 of the left hood hinge 50, which are locked by the pawls 54a, are unlocked. The first link 54 swings about the first pin 53 serving as a fulcrum, the second link 56 swings about the second pin 55 serving as a fulcrum, the upper bracket 58 swings about the third pin 57 serving as a fulcrum, and the left hood hinge 50 extends. The support member 45 is not deformed by a load received when the operating unit 40 pushes the rear end of the front hood 31 upward. Hence, the cylinder 42 of the operating unit 40 is held at the initial position.

If an impact force is applied to the front hood 31 by an obstacle in the collision of the vehicle, the support member 45 deforms or ruptures and thus enables the operating unit 40 to move. Since only the upper portion of the left operating unit 40 is mounted on the vehicle body 11, the distance from the point of action where the front hood 31 contacts up to the support point of the support member 45 is short. The deflection in the moving direction can be small, and the downward movement of the operating unit after extending is not impeded.

The function of the above-described vehicle body front structure will be described next.

Figure 9:
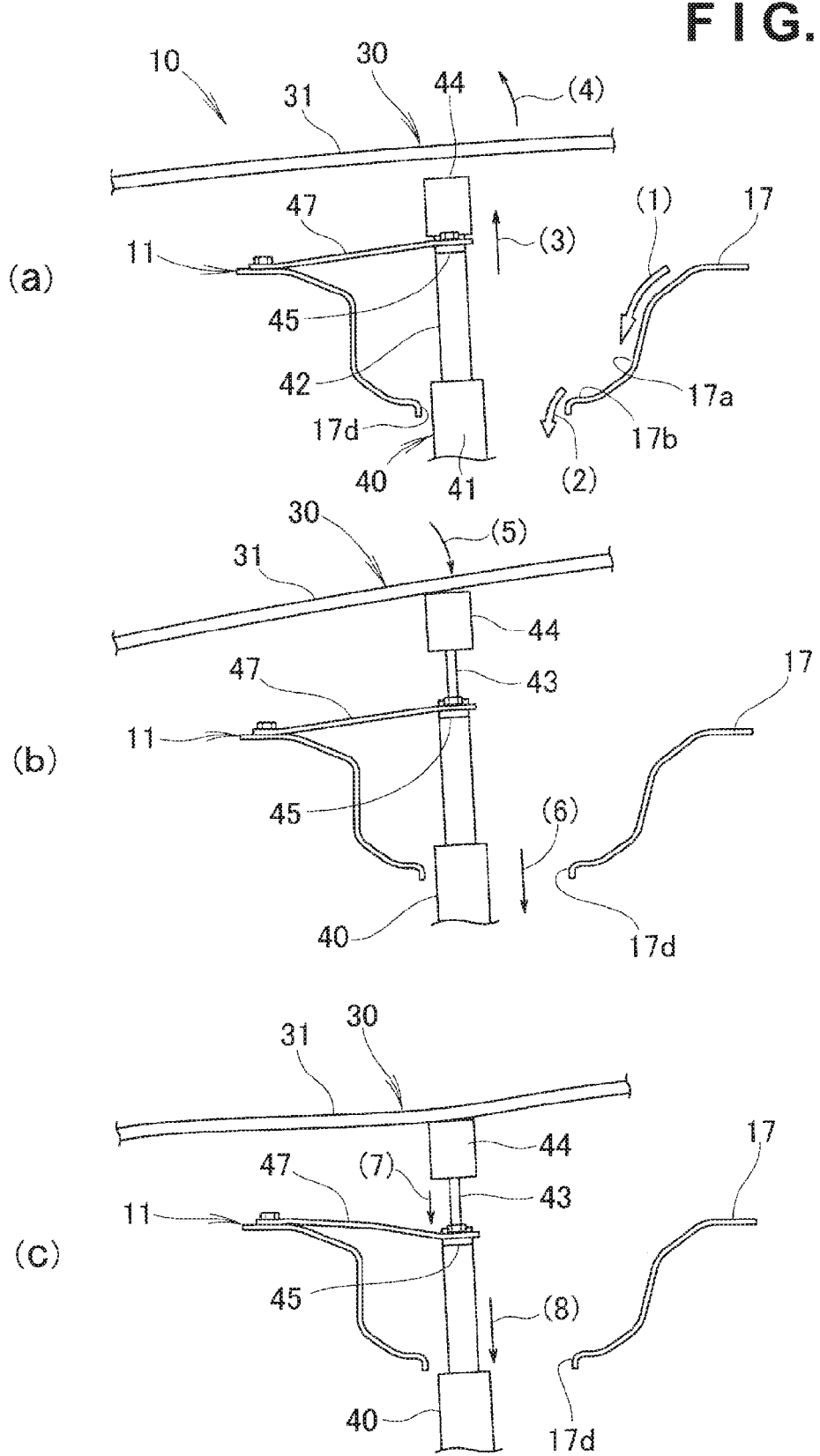
FIG. 9 shows views of the function of the vehicle body front structure according to the present invention.

As shown in FIG. 9(a), water flowing from the windshield 18 (see FIG. 1) flows on the forward downslope portion 17a, as indicated by an arrow (1), and drained from the opening portion 17d, as indicated by an arrow (2).

In the collision of vehicle, the inflator 41 operates, and the push portion 44 moves upward, as indicated by an arrow (3), and abuts against the front hood 31. The push portion 44 further moves upward, and the front hood 31 is raised, as indicated by an arrow (4).

As shown in FIG. 9(b), when a secondary impact occurs as the obstacle is thrown on the front hood 31, the front hood 31 receives a downward load and moves, as indicated by an arrow (5). The rod 43 maintains the raised state, and the entire operating unit 40 starts moving downward, as indicated by an arrow (6).

As shown in FIG. 9(c), the opening portion 17d is arranged at a position where the left operating unit 40 displaced downward can move. For this reason, the operating unit 40 after extending upward at the secondary impact directly passes through the opening portion 17d. It is therefore possible to improve the degree of freedom of layout of members while imparting the function of ensuring a clearance to retract the operating unit downward to the dashboard upper.

If the opening portion 17d is not used to ensure the clearance to retract the operating unit 40 downward, a measure of, for example, further recessing the bottom portion 17b of the dashboard upper 17 downward is necessary, and the shape of the dashboard upper 17 becomes complex. In addition, an operating unit having a complex shape needs to be formed by shortening the length of the operating unit 40 in the vertical direction. In this respect, the operating unit 40 according to the present invention has a simple shape formed long in the vertical direction as a whole. However, since the opening portion 17d is used as the clearance to retract the operating unit downward, the left operating unit 40 with the simple linear shape can be employed.

In addition, the opening portion 17d is located to insert in advance at least part of the operating unit 40 before extending upward. The opening portion 17d can thus have a guide function of moving the operating unit 40 downward. Hence, the front hood 31 can be moved smoothly at the secondary impact, and the impact force can be relaxed.

The function of the vehicle body front structure in a case in which the front hood 31 moves to the back side of the vehicle will be described next.

Figure 10:
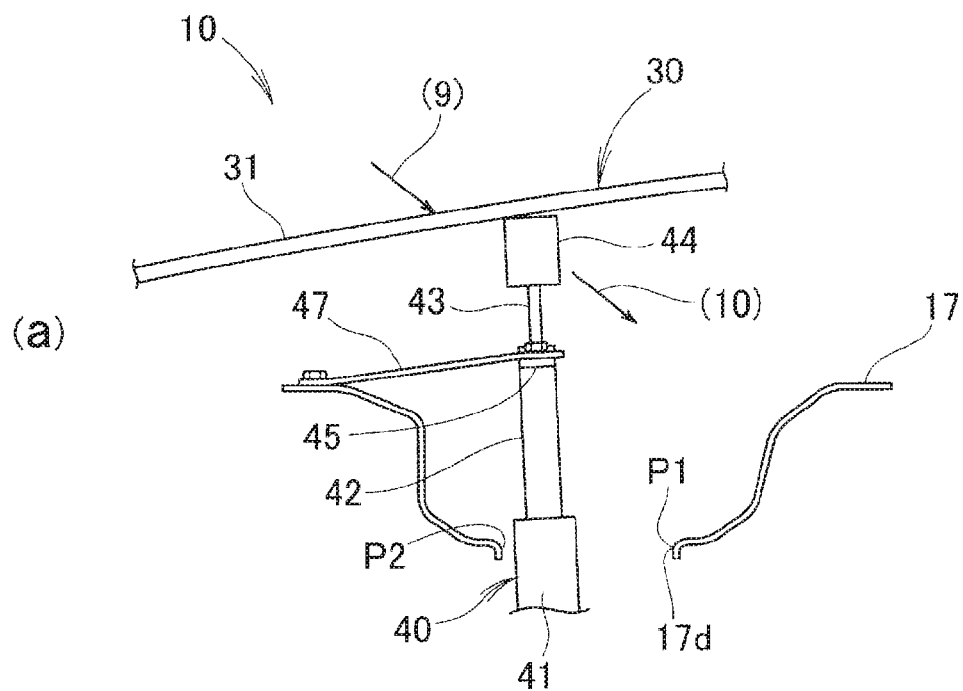
FIG. 10 shows views of the function of the vehicle body front structure in a case in which the front hood shown in FIG. 9 moves to the back side of the vehicle as well.
Figure 10:
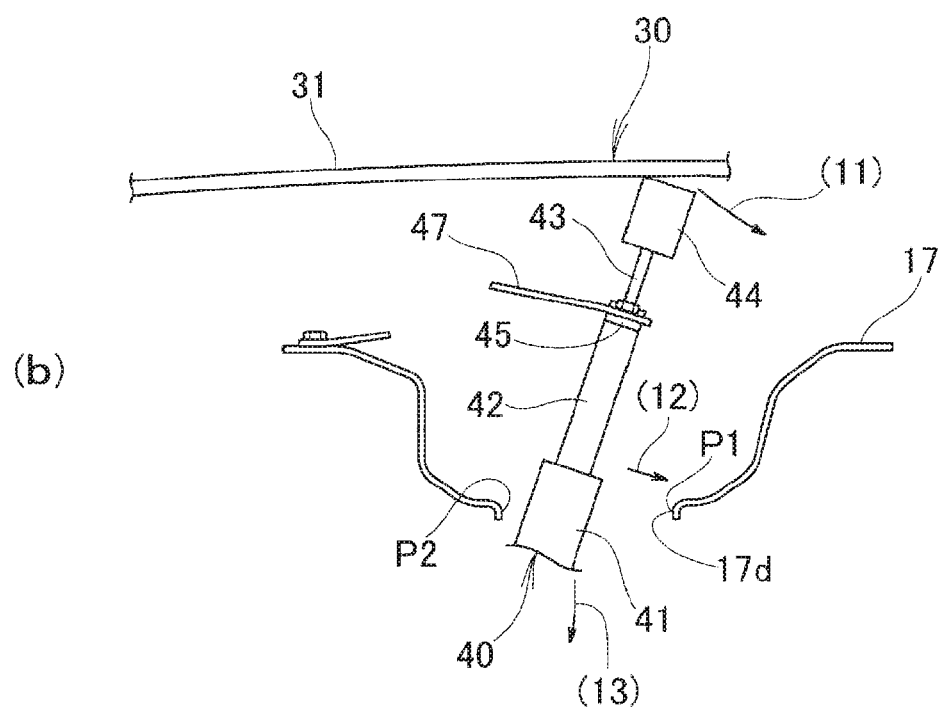

As shown in FIG. 10(a), the front hood 31 moves to the back side of the vehicle as well, as indicated by an arrow (9), depending on the collision direction of the obstacle to the front surface of the vehicle 10. For this reason, the push portion 44 moves to the lower back side, as indicated by an arrow (10).

As shown in FIG. 10(b), when the push portion 44 further moves to the back side of the vehicle, as indicated by an arrow (11), the bracket 47 deforms or ruptures, and the entire operating unit 40 moves to the back side of the vehicle, as indicated by an arrow (12). The size of the gap between the operating unit 40 and the rear edge P1 of the opening portion 17d is set to be larger than the size of the gap between the operating unit 40 and the front edge P2 of the opening portion 17d. Hence, even if the front hood 31 displaces downward while moving to the back side of the vehicle, the operating unit 40 does not interfere with the edge of the opening portion 17d. For this reason, the operating unit 40 can move downward in a desired mode after extending. The front hood 31 can be moved smoothly at the secondary impact, and the impact force can be relaxed.

Note that the vehicle body front structure according to the present invention is not limited to the above-described embodiment, and changes and modifications can appropriately be made. For example, the operating unit 40 need not have the shape long in the vertical direction, and may have a block shape short in the vertical direction or a shape with a bent lower portion.

INDUSTRIAL APPLICABILITY

The vehicle body front structure of a vehicle according to the present invention is suitable for application of an automotive safety device by a so-called popup hood including a front hood to be raised by an operating unit.

REFERENCE SIGNS LIST

10 . . . vehicle
11 . . . vehicle body
15 . . . interior
17 . . . dashboard upper
17b . . . bottom portion
17d . . . opening portion
31 . . . front hood
40 . . . left and right operating units
42a . . . upper portion of operating unit
50 . . . left and right left hood hinges
P1 . . . rear edge of opening portion
P2 . . . front edge of opening portion

The invention claimed is:

1. A vehicle body front structure in which an operating unit that extends upward to raise a front hood by a predetermined amount when a vehicle collides against an obstacle in front is arranged in a dashboard upper configured to introduce outside air into an interior, and the operating unit is mounted in a vehicle body so as to be displaced downward by an external force acting from above after extending upward, wherein an opening portion for drain is provided in a bottom portion of the dashboard upper, and the opening portion is arranged at a position where the operating unit displaced downward can move.

2. The vehicle body front structure according to claim 1, wherein the opening portion is located to insert in advance at least part of the operating unit before extending upward.

3. The vehicle body front structure according to claim 2, wherein the opening portion is formed into a hole shape long in a back-and-forth direction of the vehicle body, and a size of a gap between the operating unit and a rear edge of the opening portion is set to be larger than a size of a gap between the operating unit and a front edge of the opening portion.

4. The vehicle body front structure according to claim 1, wherein only an upper portion of the operating unit is mounted on the vehicle body.

5. The vehicle body front structure according to claim 1, wherein the opening portion is located near a hood hinge supporting the front hood.

* * * * *